(12) United States Patent
Fang

(10) Patent No.: US 10,782,432 B2
(45) Date of Patent: Sep. 22, 2020

(54) MONOPOLE ACOUSTIC LOGGING WHILE DRILLING INSTRUMENT USED TOGETHER WITH BOTTOM HOLE ASSEMBLY, METHOD FOR MEASURING SHEAR WAVE VELOCITY OF SLOW FORMATIONS

(71) Applicant: SOUTHERN UNIVERSITY OF SCIENCE AND TECHNOLOGY, Shenzhen, Guangdong (CN)

(72) Inventor: Xinding Fang, Guangdong (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 278 days.

(21) Appl. No.: 15/775,020

(22) PCT Filed: Oct. 9, 2017

(86) PCT No.: PCT/CN2017/105362
§ 371 (c)(1),
(2) Date: May 10, 2018

(87) PCT Pub. No.: WO2018/223571
PCT Pub. Date: Dec. 13, 2018

(65) Prior Publication Data
US 2019/0257970 A1    Aug. 22, 2019

(30) Foreign Application Priority Data

Jun. 7, 2017   (CN) .......................... 2017 1 0422709

(51) Int. Cl.
*G01V 1/46*    (2006.01)
*E21B 49/00*   (2006.01)
(Continued)

(52) U.S. Cl.
CPC ................ *G01V 1/46* (2013.01); *E21B 49/00* (2013.01); *G01V 1/44* (2013.01); *G01V 1/52* (2013.01);
(Continued)

(58) Field of Classification Search
CPC ... G01V 1/46; G01V 1/44; G01V 1/52; G01V 2200/16; E21B 49/00
See application file for complete search history.

(56) References Cited

U.S. PATENT DOCUMENTS 6,088,294 A * 7/2000 Leggett, III ............ E21B 44/00
                                                     175/45
7,518,949 B2 * 4/2009 Haugland ................ G01V 1/48
                                                     367/25
(Continued)

FOREIGN PATENT DOCUMENTS

CN       101285381       10/2008
CN       102162358       8/2011
(Continued)

OTHER PUBLICATIONS

Yang et al. "FDTD simulation and analysis of the collar wave propagation in acoustic logging while drilling" Chinese Journal of Geophysics, Jan. 31, 2016, Issue No. 1, vol. 59, 13 pages.
English translation of International Search Report and Written Opinion of the ISA for PCT/CN2017/105362, dated Mar. 7, 2018, 7 pages.

*Primary Examiner* — Justin N Olamit
(74) *Attorney, Agent, or Firm* — Nixon & Vanderhye PC

(57) ABSTRACT

A monopole acoustic logging while drilling instrument used together with a bottom hole assembly and a method for measuring a shear wave velocity of slow formations, wherein the bottom hole assembly includes a drill collar and a drill bit, wherein the monopole acoustic logging while drilling instrument is installed on the drill collar. The monopole acoustic logging while drilling instrument comprises:

(Continued)

an acoustic receiver array installed on the drill collar; a monopole acoustic source arranged at the drill collar, wherein the monopole acoustic source is configured to emit acoustic waves with a frequency in a preset frequency range, and the ratio of the outer diameter D1 of the drill collar to the outer diameter D2 of the drill bit is d, and $0.75<d<1$.

11 Claims, 3 Drawing Sheets

(51) Int. Cl.
*G01V 1/52* (2006.01)
*G01V 1/44* (2006.01)
(52) U.S. Cl.
CPC .. *G01V 2200/16* (2013.01); *G01V 2210/6222* (2013.01)

(56) References Cited

U.S. PATENT DOCUMENTS

| | | | |
|---|---|---|---|
| 8,561,720 B2* | 10/2013 | Edbury | E21B 7/06 175/26 |
| 10,443,375 B2* | 10/2019 | Nguyen | G01V 1/44 |
| 2007/0187149 A1* | 8/2007 | Kristensen | E21B 10/42 175/57 |
| 2016/0130936 A1 | 5/2016 | Khajeh et al. | |

FOREIGN PATENT DOCUMENTS

| | | |
|---|---|---|
| CN | 102720484 | 10/2012 |
| CN | 103147747 | 6/2013 |
| CN | 107165623 | 9/2017 |

* cited by examiner

MONOPOLE ACOUSTIC LOGGING WHILE DRILLING INSTRUMENT USED TOGETHER WITH BOTTOM HOLE ASSEMBLY, METHOD FOR MEASURING SHEAR WAVE VELOCITY OF SLOW FORMATIONS

This application is the U.S. national phase of International Application No. PCT/CN2017/105362 filed Oct. 9, 2017 which designated the U.S. and claims priority to CN Patent Application No. 201710422709.4 filed Jun. 7, 2017, the entire contents of each of which are hereby incorporated by reference.

FIELD OF THE INVENTION

The present application relates to the technical field of petroleum well logging, and more particularly to a monopole acoustic logging while drilling instrument used together with bottom hole assembly and a method for measuring shear wave velocity of slow formations.

DESCRIPTION OF THE RELATED ART

According to the logging operation, the oil field well logging can be divided into wireline logging and logging while drilling. The wireline acoustic logging is to lower an acoustic logging instrument into an oil well through a cable to collect data, wherein the logging operation process requires the drilling operations to be stopped and the drill pipe to be drawn out, so that the acoustic logging instrument can be lowered into the oil well. The logging while drilling achieves that measuring data while drilling the well. Due to the fact that the logging while drilling does not affect the progress of the drilling operations, the overall completion time of the engineering project can be shortened so as to reduce the cost.

The main object of acoustic logging is to measure the compressional wave velocity and the shear wave velocity of the formations through an acoustic method. The data can be used for calculating the elastic moduli, porosity, pore pressure and other petrophysical and geomechanical properties of the formations.

As to the acoustic logging while drilling, a great deal of the understanding of the characteristics of the borehole acoustic response are based on the extensions of the research on the wireline acoustic logging. In order to reduce interference of the acoustic logging instrument on the data measurement, special structural designs, materials and devices are adopted for the wireline acoustic logging instrument to achieve sound insulation between the acoustic source and the receivers. The acoustic logging while drilling instrument is directly arranged on a drill collar, and the drill collar needs to be guaranteed to have enough strength to support drilling activities of the drill bit, so a preferable sound insulation effect is difficult to achieve with the acoustic logging while drilling instrument, and the overall acoustic impedance of the acoustic logging while drilling instrument is relatively high. Therefore, there are great differences between the influence of acoustic logging while drilling and that of the wireline acoustic logging over the data measurement.

The modern acoustic logging while drilling method mainly comprises a monopole acoustic source and a quadrupole acoustic source. When the shear wave velocity of the formations is larger than the wave velocity of the drilling fluid in the oil well, the formations are referred to as fast formations. The monopole logging obtains the information of the compressional wave velocity and the shear wave velocity of the formations through measuring the travel time differences between the sliding compressional waves and the sliding shear waves received in the oil well. When the shear wave velocity of the formations is smaller than the wave velocity of the drilling fluid, the formations are referred to as slow formations. Only the compressional wave can form sliding compressional wave on the oil well wellbore in the slow formations, and sliding shear wave cannot be formed, at the moment, the monopole logging can only obtain the compressional wave velocity of the formations. As to the measurement of the shear wave velocity of the slow formations, a screw wave generated from the quadrupole acoustic source needs to be analyzed through the quadrupole logging. Therefore, if the information of the compressional wave velocity and the shear wave velocity of the formations are wanted to be obtained through the logging while drilling, the monopole logging is only needed to be utilized in the fast formations. However, the monopole logging and the quadrupole logging are required to be used together in the slow formations. A number of soft mudstone formations or sandstone formations with relatively high pore pressure or poor consolidation are typical slow formations, the shear wave velocity of which is smaller than the wave velocity of the drilling fluid.

In slow formations, a traditional monopole source can only be used for measuring the compressional wave velocity, the information of the shear wave velocity of formations can be obtained only through additionally applying screw waves generated by the quadrupole acoustic source. However, the screw wave velocity is related to the frequency of the screw waves, waves with different frequencies are spread at different velocities (the phenomenon is referred to as frequency dispersion). The screw waves generated from the quadrupole acoustic source includes a plurality of frequency elements, and only when the frequency is close to the low-frequency cut-off frequency, the corresponding wave velocity is the real shear wave velocity of the formations. Therefore, the quadrupole logging data needs to be subjected to some special data processing so as to eliminate impacts of the frequency dispersion, and only in this way the real shear wave velocity of the formations can be obtained. The frequency dispersion characteristics of the screw waves are also influenced by the structure and attributes of the acoustic logging while drilling instrument, so that a complex data processing needs to be carried out when measuring the shear wave velocity of the formations with the quadrupole logging, which may result in reducing the reliability of the result. Therefore, when applying the monopole logging and the quadrupole logging together to analyze the shear wave velocity of the formations, the operation process and the data processing are complicated so that the measurement precision is not high and the efficiency is reduced.

SUMMARY OF THE INVENTION

According to a technical solution as provided by the present application, the technical problems that exist in the prior art can be solved, that for measuring the shear wave velocity of the slow formations, the monopole logging and the quadrupole logging have to be utilized together to analyze the shear wave velocity of the formations, wherein the operation process and the data processing are complex, which results in reducing the measurement efficiency.

In order to achieve the above objects, the present application provides a monopole acoustic logging while drilling instrument used together with bottom hole assembly (the device can also be referred to as a well logging instrument used together with drilling assembly, namely the bottom hole assembly is called as a drilling assembly for short, and the monopole acoustic logging while drilling instrument is called as a well logging instrument for short), the bottom hole assembly including a drill collar and a drill bit, and the drill bit is assembled at the end of the drill collar, wherein the monopole acoustic logging while drilling instrument is installed on the drill collar, and the monopole acoustic logging while drilling instrument comprises: an acoustic receiver array, the acoustic receiver array is installed on the drill collar; a monopole acoustic source, the monopole acoustic source is arranged at the drill collar, wherein the monopole acoustic source is configured to emit acoustic waves with a frequency in a preset frequency range; wherein the ratio of the outer diameter D1 of the drill collar to the outer diameter D2 of the drill bit is d, and 0.75<d<1.

Further, the acoustic receiver array and the monopole acoustic source are arranged at intervals along the direction from the drill collar to the drill bit.

Further, the preset frequency range of acoustic waves emitted by the monopole acoustic source ranges from 7 kHz to 9 kHz.

Further, the preset frequency range of acoustic waves emitted by the monopole acoustic source ranges from 5 kHz to 10 kHz.

Further, the number of the acoustic receiver array is plural, and a plurality of the acoustic receiver arrays are arranged at intervals in the central axis direction of the drill collar.

Further, an inclined angle between the acoustic excitation direction and the normal direction of the wellbore surface of the oil well is formed to be from 40 degrees to 50 degrees.

Further, an inclined angle between the acoustic excitation direction and the normal direction of the wellbore surface of the oil well is formed to be from 30 degrees to 60 degrees.

Further, the distance between the monopole acoustic source and the drill bit is more than ten meters.

Further, the drill collar includes a plurality of sequentially connected steel rod-shaped sections, wherein both the acoustic receiver array and the monopole acoustic source are arranged on one of the plurality of the steel rod-shaped sections.

Further, the monopole acoustic source and the acoustic receiver array are connected via the sound insulator.

Further, the monopole acoustic logging while drilling instrument further includes a control circuit module and a data memory module, wherein the control circuit module is electrically connected with the acoustic receiver array, the monopole acoustic source and the data memory module respectively, wherein both the control circuit module and the data memory module are arranged in an inner cavity of the drill collar.

According to another aspect of the present application, the present application further provides a method for measuring the shear wave velocity of slow formations, wherein the above-mentioned monopole acoustic logging while drilling instrument used together with bottom hole assembly was applied to carry out the well drilling operations and measuring operations, and during the drilling operation process, the measurements of the compressional wave velocity and the shear wave velocity of the formations are simultaneously carried out, wherein the measuring operations includes the following steps:

S10: utilizing the monopole acoustic source to excite acoustic signals;

S20: receiving the acoustic data propagated via the formations through the acoustic receiver array;

S30: when the measured formations are fast formations, utilizing the sliding compressional wave to calculate the compressional wave velocity of the formations, and utilizing the sliding shear wave to calculate the shear wave velocity of the formations;

S40: when the measured formations are slow formations, utilizing the sliding compressional waves to calculate the compressional wave velocity of the formations, and through directly measuring the transmitted shear waves in the formations to calculate the shear wave velocity of the formations.

A drilling assembly composed of a drill bit and a drill collar is utilized for carrying out oil well drilling process. Meanwhile, a measurement assembly composed of the acoustic receiver array and the monopole acoustic source is utilized for measuring the compressional wave velocity of the formations and the shear wave velocity of the formations. Through the design, the ratio 'd' of the outer diameter D1 of the drill collar to the outer diameter D2 of the drill bit is larger than 0.75, in the meantime, the frequency range of the acoustic waves excited by the monopole acoustic source is set, so that the acoustic receiver array receives the transmitted shear wave in the formations, and therefore the shear wave velocity of the formations is measured utilizing the transmitted shear wave. Thus, the operation of measuring the shear wave velocity of the formations only needs to apply the monopole logging, wherein the monopole logging and the quadrupole logging are not required to be used together to measure the shear wave velocity of the formations. Operation difficulties of measuring the shear wave velocity of the formations is simplified, so that the efficiency of measuring shear wave velocity of the formations with the stability and accuracy of measurement data are improved.

BRIEF DESCRIPTION OF THE DRAWINGS

In order to illustrate the embodiments as provided by the present application more clearly, drawings required to be used in the description of the embodiments or in the prior art will be introduced briefly hereinafter. Obviously, the drawings in the following description are only for some embodiments of the present application. For those skilled in the art, other drawings can be obtained according to the drawings provided herein without creative efforts.

Figure 1:
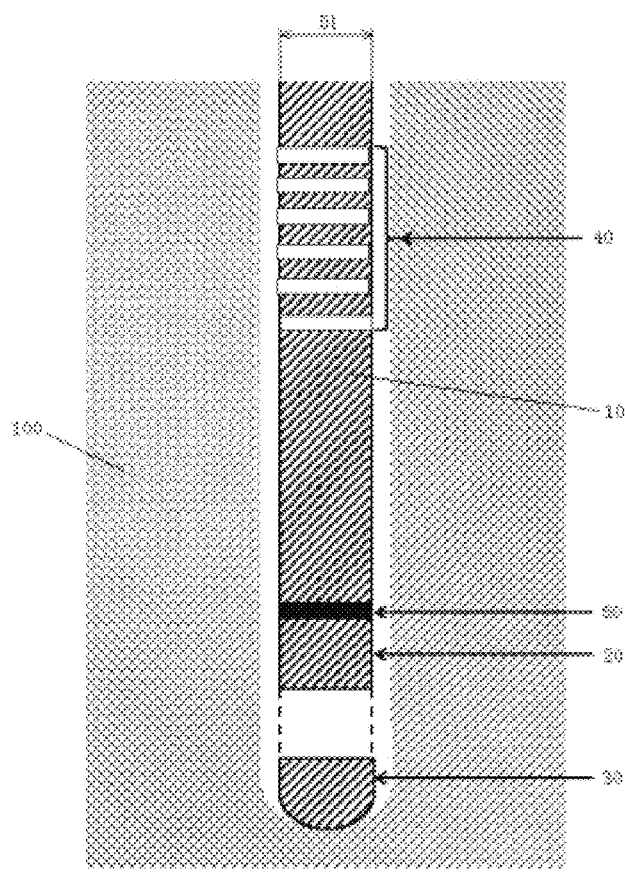
FIG. 1 is a sectional structural schematic view of a side of a monopole acoustic logging while drilling instrument used together with bottom hole assembly in an oil well according to an embodiment of the present application.

Wherein, reference numerals shown in the drawings:
100. Formations; 10. Sound Insulator; 20. Drill Collar; 30. Drill Bit; 40. Acoustic Receiver Array; 50. Monopole Acoustic Source.

DETAILED DESCRIPTION OF THE ENABLING EMBODIMENTS

In order to enable technical problems, technical solutions, and beneficial effects of the present application to be clearer and more understandable, the present application will be further described in detail hereinafter with reference to the drawings and embodiments. It should be understood that the specific embodiments described hereinafter are only intended to illustrate but not to limit the present application.

It should be noted that when an element is referred to as being "fixed" or "provided/arranged" to another element, it can be provided directly or indirectly to the other element. When an element is referred to as being "connected" to another element, it can be connected directly to the other element or indirectly to the other element.

It should be understood that the term "length", "width", "upper", "lower", "front", "back", "left", "right", "vertical", "horizontal", "top", "bottom", "inner" or "outer" and the like, the orientation or the position relationship indicated by said items is based on the orientation or position relationship shown in the drawings, which is only intended to facilitate the description of the present application and to simplify the description and is not to indicate or imply that the indicated device or element must possess a specific orientation, or must be constructed and operated in a specific orientation. Therefore, said items are not to be understood to be the limitation to the present application.

In addition, the terms "first" and "second" are used only for purposes of description, and are not understood to indicate or imply the relative importance or to implicitly indicate the number of the indicated technical features. Thus, the features limited by "first", "second" can expressly or implicitly includes one or more of said features. In the description of the present application, "multiple" means that the number is two or more than two, unless being explicitly defined otherwise, and "plurality" means that the number is one or more than one, unless being explicitly defined otherwise.

Figure 2:
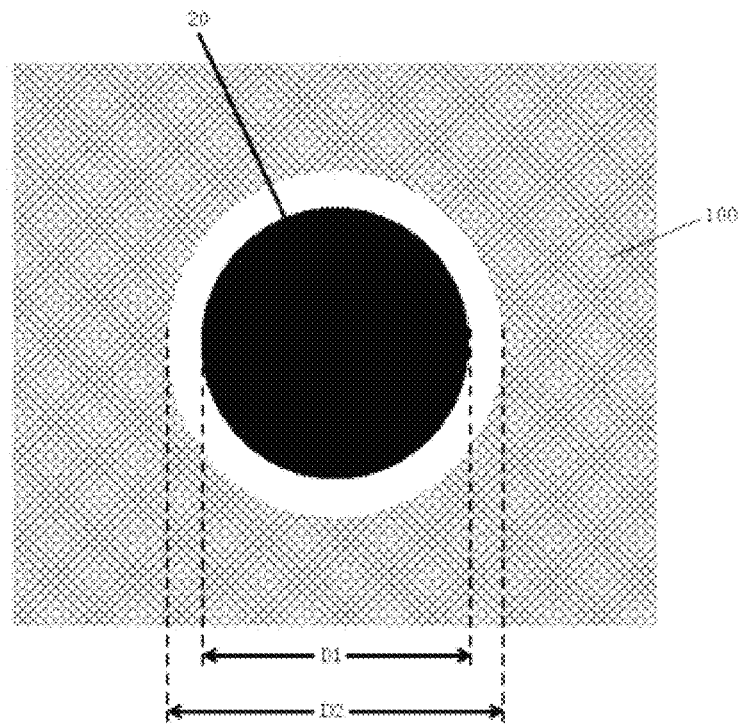
FIG. 2 is a top structural schematic view of the monopole acoustic logging while drilling instrument used together with bottom hole assembly in an oil well according to an embodiment of the present application.

As shown in FIG. 1 and FIG. 2, a monopole acoustic logging while drilling instrument used together with bottom hole assembly as provided by the embodiment, wherein the bottom hole assembly includes a drill collar 20 and a drill bit 30, wherein a monopole acoustic logging while drilling instrument is installed on the drill collar 20. The monopole acoustic logging while drilling instrument comprises an acoustic receiver array 40 and a monopole acoustic source 50. Wherein the drill bit 30 is assembled at the end of the drill collar 20, and the acoustic receiver array 40 is installed on the drill collar 20, the monopole acoustic source 50 is arranged on the drill collar 20. The monopole acoustic source 50 and the acoustic receiver array 40 are arranged on the drill collar 20 at intervals, wherein the acoustic receiver array 40 and the monopole acoustic source 50 are arranged along the direction from the drill collar 20 to the drill bit 30. The monopole acoustic source 50 is configured to emit acoustic waves with a frequency in a preset frequency range. wherein the ratio of the outer diameter D1 of the drill collar 20 to the outer diameter D2 of the drill bit 30 is d, and 0.75<d<1.

Applying the monopole acoustic logging while drilling instrument used together with bottom hole assembly as provided by the present application to carry out oil well drilling in the meantime to carried out the logging while drilling of the formations 100. A drilling assembly composed of the drill bit 30 and the drill collar 20 is utilized to carry out the process of oil well drilling (the drill collar 20 is connected to a drill pipe, wherein the drill collar 20, drill bit 30 are driven by the drill pipe which is driven by an actuating unit to rotate). Meanwhile, a logging assembly composed of the acoustic receiver array 40 and the monopole acoustic source 50 is utilized to measure the compressional wave velocity of the formations and the shear wave velocity of the formations. The ratio 'd' of the outer diameter D1 of the drill collar 20 to the diameter of the borehole of the drilled oil well (namely the outer diameter D2 of the drill bit) is designed to be bigger than 0.75 (namely 0.75<d<1, wherein d=D1/D2). In the meantime, the acoustic frequency range excited by the monopole acoustic source 50 is set, so that transmitted shear waves in the formations 100 can be received by the acoustic receiver array 40 so as to measure the shear wave velocity of the formations through the transmitted shear wave. Therefore, the measuring operation of the shear wave velocity of the formations only needs to apply the monopole logging. The monopole logging and the quadrupole logging are not required to be used together to measure the shear wave velocity of the formations, so that the operation difficulties of measuring the shear wave velocity of the formations is simplified, and the efficiency of measuring the shear wave velocity of the formations with the stability and accuracy of the measurement data are improved.

The research experiment result proves that in the logging while drilling process, the ratio 'd' of the outer diameter D1 of the drill collar 20 to the diameter of the borehole, namely the outer diameter D2 of the drill bit 30, reaches a certain proportion range, namely 0.75<d, and when the frequency of the acoustic source excited by the monopole acoustic source 50 is correspondingly set in a proper frequency range, the drill collar 20 with a high acoustic impedance enables the Stoneley wave and the transmitted shear wave in the slow formations to be decoupled from each other, so that the transmitted shear wave of the formations is detected by the acoustic receiver array 40. Due to the fact that the transmitted shear wave of the formations is not affected by the frequency dispersion, in other word, the transmitted shear waves of all frequencies propagate at the shear wave velocity of the formations, so that the velocity of the transmitted shear wave of the formations is directly utilized for measuring the shear wave velocity of the formations.

In the embodiment, the preset frequency range of the acoustic waves emitted by the monopole acoustic source 50 ranges from 5 kHz to 10 kHz, for example, the frequencies of the excited acoustic waves are 5 kHz, 5.5 kHz, 6 kHz, 6.5 kHz, 7 kHz, 7.5 kHz, 8 kHz, 8.5 kHz, 9 kHz, 9.5 kHz, 10 kHz. Of course, other frequencies of acoustic waves in the frequency range can also be set, for example, 5.6 kHz, 7.8 kHz and the like. When the acoustic waves are excited in said acoustic frequency range, the interference of other signal waves in the oil well is reduced. Preferably, during actual measurements, acoustic waves with the acoustic frequency range of 7 kHz to 9 kHz are selected for excitation measurement.

As shown in FIG. 1, the number of the acoustic receiver array 40 in the monopole acoustic logging while drilling instrument in the embodiment is plural, a plurality of acoustic receiver arrays 40 are arranged at intervals in the central axis direction of the drill collar 20. In this way, an array form arrangement thereof from top to bottom is formed on the drill collar 20. The acoustic waves are excited by the monopole acoustic source 50 and are propagated to the oil well formation 100 to form compressional polarization formation waves and the shear polarization formation waves. After the compressional polarization formation waves and the shear polarization formation waves are propagated, by means of the acoustic receiver array 40 arranged in an array form, the signal-to-noise ratio of received sliding compressional waves, sliding shear waves and the transmitted shear waves of the formations propagated via the formations 100 is increased, so that the velocity of the compressional wave of the formations and the shear wave velocity of the formations are measured.

Figure 3:
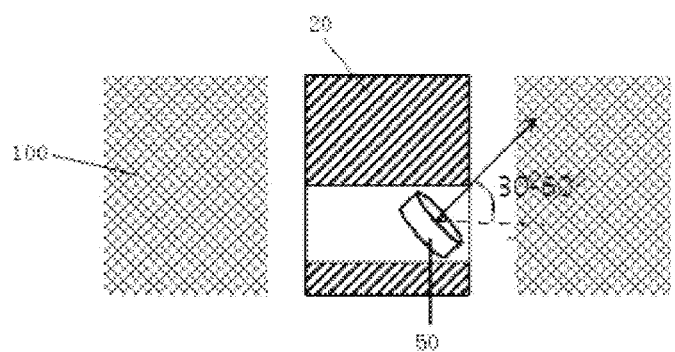
FIG. 3 is a structural schematic assembling view of the monopole acoustic source in the monopole acoustic logging instrument used together with bottom hole assembly according to an embodiment of the present application.

As shown in FIG. 3, in order to increase the strength of the transmitted shear wave of the formations, an inclined angle ranged from 30 degrees to 60 degrees is formed between the acoustic excitation direction of the monopole acoustic source 50 and the normal direction of the wellbore surface. The monopole acoustic source 50 is configured to excite the required acoustic waves and to convert the required acoustic waves into corresponding transmitted waves in the formations 100. Due to the arrangement of the acoustic excitation angle, the wave energy of the transmitted shear wave converted from the excited acoustic waves in the formations 100 are higher, so that the strength of the transmitted shear wave of the formations is enhanced, and the acoustic receiver array 40 receives the transmitted shear wave of the formations more clearly. Preferably, the inclined angle between the acoustic excitation direction of the monopole acoustic source 50 and the normal direction of the wellbore surface of the oil well is designed to be from 40 degrees to 50 degrees, and more preferably 45 degrees.

When the monopole acoustic source 50 is excited, in the meantime drill collar waves are formed on the drill collar, and the drill collar waves will influence the effective signals of the formations 100 received by the acoustic receiver array 40 to a certain extent. Therefore, in order to reduce the influence of drill collar waves, the monopole acoustic logging while drilling instrument further includes a sound insulator 10, the sound insulator 10 is connected to the drill collar 20, and the sound insulator 10 is arranged in between the acoustic receiver array 40 and the monopole acoustic source 50. At the moment, an acoustic blocking state is formed between the acoustic receiver array 40 and the monopole acoustic source 50 through the sound insulator 10, so that the influence of the drill collar waves on the reception of the formation waves by the acoustic receiver array 40 is weakened.

The drill collar 20 is formed by combining a plurality of steel rod-shaped sections with large weight and rigidity, and the drill bit 30 is assembled at the end of the drill collar 20. The monopole acoustic logging while drilling instrument is one section of the whole drill collar assembly (namely, the monopole acoustic logging while drilling instrument is installed between the steel rod-shaped sections), wherein the distance between the monopole acoustic source 50 and the drill bit 30 of the monopole acoustic logging while drilling instrument is more than ten meters or larger.

Further, the monopole acoustic logging while drilling instrument further includes a control circuit module (not shown) and a data memory module (not shown). Wherein, the control circuit module is electrically connected with the acoustic receiver array 40, and the control circuit module is electrically connected with the monopole acoustic source 50, and the control circuit module is electrically connected with the data memory module. Both the control circuit module and the data memory module are arranged in an inner cavity of the drill collar 20 installed on the logging instrument. During the operation process of logging while drilling, the drill bit 30 performs the operation of drilling an oil well, and meanwhile, the control circuit module is configured for activating the monopole acoustic source 50 to excite and measure the acoustic waves. The control circuit module is configured for activating the acoustic receiver array 40 to measure the sliding compressional wave, the sliding shear wave, or the transmitted shear wave of the formations propagated via the formations 100, and the measured data, such as acoustic pressure electric signals, are converted into electrical signals by the control circuit module, and then the electrical signals are recorded into the data memory module by the control circuit module. In the last data processing: for the fast formations, the recorded sliding compressional waves are directly utilized for calculating the compressional wave velocity of the formations, and the recorded sliding shear wave is directly utilized for calculating the shear wave velocity of the formations; for the slow formations, the compressional wave velocity of the formations is still calculated by utilizing the recorded sliding compressional waves, and the shear wave velocity of the formations is obtained by analyzing the recorded transmitted shear waves of the formations.

Figure 4:
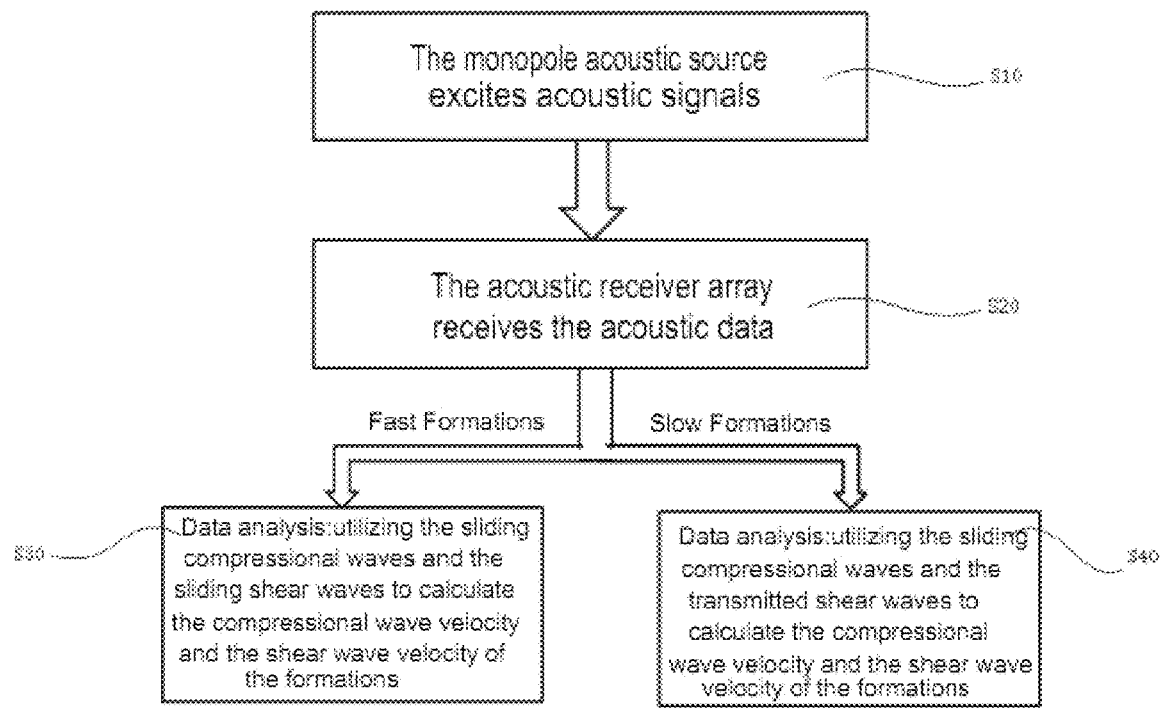
FIG. 4 is a flow diagram of the process of measurement carried out by the monopole acoustic logging instrument in the monopole acoustic logging instrument used together with bottom hole assembly according to an embodiment of the present application.

According to another aspect of the present application, the present application provides a method for measuring the shear wave velocity of the slow formations. As shown in FIG. 4, the method for measuring the shear wave velocity of slow formations applies said monopole acoustic logging while drilling instrument used together with bottom hole assembly to carry out well drilling operations and measurement operations, wherein the method for measuring the shear wave velocity of slow formations comprises the following steps:

S10: Utilizing a monopole acoustic source 50 to excite acoustic signals, the frequency of the acoustic waves excited by the monopole acoustic source 50 in the monopole acoustic logging while drilling instrument is set to be from 5 kHz to 10 kHz. Moreover, the inclined angle ranged from 30 degrees to 60 degrees is formed between the direction of the acoustic waves excited by the monopole acoustic source 50 and the normal direction of the wellbore surface of the oil well, which combined with the ratio 'd' of the outer diameter D1 of the drill collar 20 to the borehole diameter of the oil well (namely the outer diameter D2 of the drill bit), wherein the ratio 'd' is $0.75<d<1$;

S20: Receiving the acoustic data propagated via the formations through the acoustic receiver array 40, so that after the acoustic waves excited by the monopole acoustic source 50 are converted and spread through the formation 100, the acoustic receiver array 40 receives the sliding compressional waves, the sliding shear waves or the transmitted shear waves of the formations 100;

S30: In the data analysis stage, when the measured formations 100 are fast formations, utilizing the sliding compressional waves to calculate the compressional wave velocity of the formations, and utilizing the sliding shear waves to calculate the shear wave velocity of the formations S40: In the data analysis stage, when the measured formations 100 are slow formations, utilizing the sliding compressional waves to calculate the compressional wave velocity of the formations, and through directly measuring the transmitted shear waves in the formations to calculate the shear wave velocity of the formations.

Figure 5:
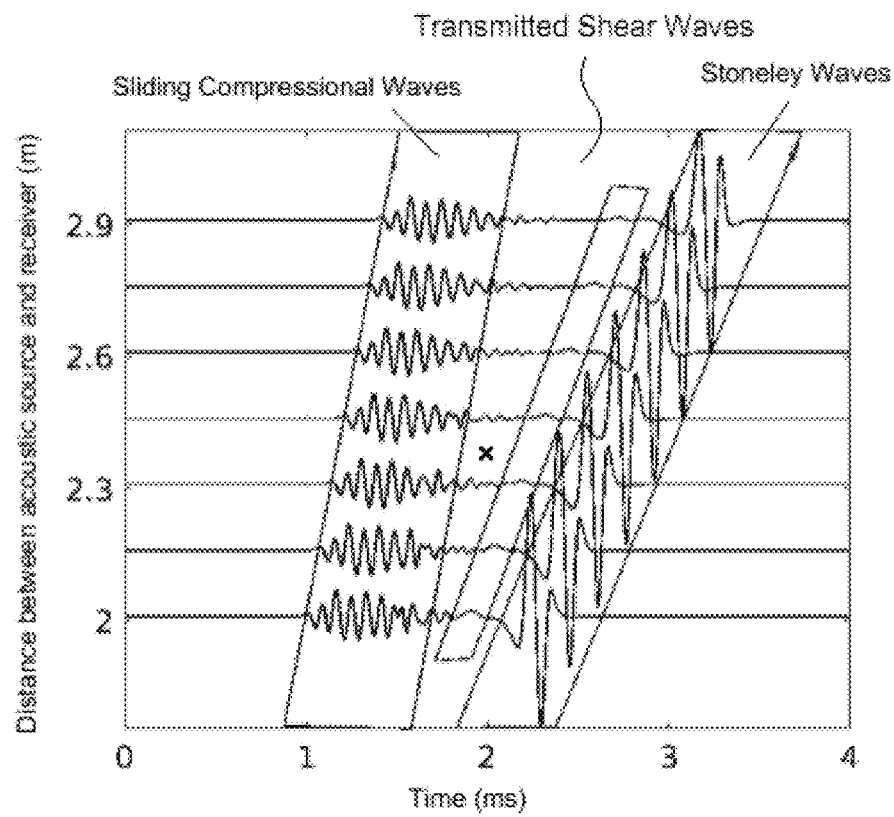
FIG. 5 is an acoustic logging graph obtained through the measurement carried out by the monopole acoustic logging instrument in the monopole acoustic logging instrument used together with bottom hole assembly according to an embodiment of the present application.

As shown in FIG. 5, the method for measuring the shear wave velocity of slow formations provided by the present application applies said monopole acoustic logging while drilling instrument to carry out logging while drilling operation, and obtain an acoustic logging graph of the sliding compressional waves, transmitted shear waves, Stoneley waves of the formations 100 and relevant metrological parameters (time parameter/ms, the distance between the monopole acoustic source and the acoustic receiver array/m). Through the transmitted shear waves of the formations shown in the drawing, the shear wave velocity of the formations is conveniently calculated.

The above-mentioned embodiments are only used to illustrate the technical solutions of the present application and are not intended to limit the present application. Although the present application is described in detail with reference to the embodiments described above, the ordinary skilled in the art should understand that the technical solutions described in the above-mentioned embodiments can still be modified, or part of the technical features thereof can still be equivalently replaced. However, said modifications or replacements do not enable the essence of the corresponding technical solutions to be detached from the spirit and scope of the technical solutions of the embodiments provided by the present application. Said modifications or replacements are all included in the protection scope of the present application.

The invention claimed is:

1. A method for measuring a shear wave velocity of formations, using an instrument for monopole acoustic logging while drilling together with a bottom hole assembly to carry out well drilling operations and measuring operations, the bottom hole assembly including a drill collar and a drill bit assembled at the end of the drill collar, and the instrument for monopole acoustic logging while drilling being configured to be installed on the drill collar and comprising:

an acoustic receiver array configured to be installed on the drill collar, and a monopole acoustic source configured to be arranged at the drill collar, wherein the monopole acoustic source is further configured to emit acoustic waves with a frequency in a preset frequency range, wherein a ratio of an outer diameter of the drill collar to an outer diameter of the drill bit is larger than 0.75 and smaller than 1, the method comprising, during a drilling operation process, simultaneously carrying out measurements of a compressional wave velocity and the shear wave velocity of the formations including:

utilizing the monopole acoustic source to excite acoustic signals;

receiving acoustic data propagated via the formations through the acoustic receiver array;

utilizing sliding compressional waves to calculate the compressional wave velocity of the formations; and when the formations under measurement are fast formations, utilizing sliding shear waves to calculate the shear wave velocity of the formations, and when the formations under measurement are slow formations, directly measuring transmitted shear waves in the formations to calculate the shear wave velocity of the formations.

2. The method of claim 1, wherein the acoustic receiver array and the monopole acoustic source are arranged at an interval along a direction from the drill collar to the drill bit.

3. The method of claim 1, wherein the preset frequency range of the acoustic waves emitted by the monopole acoustic source is from 7 kHz to 9 kHz.

4. The method of claim 1, wherein the preset frequency range of the acoustic waves emitted by the monopole acoustic source is from 5 kHz to 10 kHz.

5. The method of claim 1, wherein the acoustic receiver array comprises a plurality of acoustic receivers arranged at intervals in a central axis direction of the drill collar.

6. The method of claim 1, wherein an inclined angle between an acoustic excitation direction and a normal direction of a wellbore surface of an oil well is formed to be from 40 degrees to 50 degrees.

7. The method of claim 1, wherein an inclined angle between an acoustic excitation direction and a normal direction of a wellbore surface of an oil well is formed to be from 30 degrees to 60 degrees.

8. The method of claim 7, wherein a distance between the monopole acoustic source and the drill bit is more than ten meters.

9. The method of claim 8, wherein the drill collar includes a plurality of sequentially connected steel rod-shaped sections, both the acoustic receiver array and the monopole acoustic source being arranged on one of the plurality of the steel rod-shaped sections.

10. The method of claim 1, wherein the monopole acoustic source and the acoustic receiver array are connected via a sound insulator.

11. The method of claim 10, wherein the instrument for monopole acoustic logging while drilling further includes a control circuit and a data memory, the control circuit being electrically connected with the acoustic receiver array, the monopole acoustic source and the data memory respectively, and both the control circuit and the data memory being arranged in an inner cavity of the drill collar.

* * * * *